(12) United States Patent
Bechthold et al.

(10) Patent No.: US 12,049,112 B2
(45) Date of Patent: Jul. 30, 2024

(54) TIRE PRESSURE CONTROL DEVICE FOR AN OFF-ROAD VEHICLE

(71) Applicant: WABCO GmbH, Hannover (DE)

(72) Inventors: Sebastian Bechthold, Hannover (DE); Mirko Brütt, Ronnenberg (DE); Michael Haverkamp, Hannover (DE); Waldemar Kamischke, Neustadt (DE); Dennis Sabelhaus, Rinteln (DE)

(73) Assignee: ZF CV Systems Europe BV, Brussels (BE)

( * ) Notice: Subject to any disclaimer, the term of this patent is extended or adjusted under 35 U.S.C. 154(b) by 932 days.

(21) Appl. No.: 17/043,900

(22) PCT Filed: Mar. 21, 2019

(86) PCT No.: PCT/EP2019/057122
§ 371 (c)(1),
(2) Date: Sep. 30, 2020

(87) PCT Pub. No.: WO2019/192854
PCT Pub. Date: Oct. 10, 2019

(65) Prior Publication Data
US 2021/0016611 A1    Jan. 21, 2021

(30) Foreign Application Priority Data
Apr. 5, 2018    (DE) ............... 10 2018 108 006.9

(51) Int. Cl.
B60C 23/00    (2006.01)
(52) U.S. Cl.
CPC .. B60C 23/00372 (2020.05); B60C 23/00354 (2020.05); B60C 23/008 (2013.01);
(Continued)

(58) Field of Classification Search
CPC ........ B60C 23/00372; B60C 23/00354; B60C 23/008; B60C 23/009; B60C 2200/06;
(Continued)

(56) References Cited

U.S. PATENT DOCUMENTS 6,145,558 A * 11/2000 Schmitz ............ B60C 23/00318
152/416

FOREIGN PATENT DOCUMENTS

AT    5548 U1    8/2002
AT    8904 U1    2/2007
(Continued)

OTHER PUBLICATIONS

European Patent Office, Rijswijk, Netherlands, International Search Report of International Application No. PCT/EP2019/057122, Mailed Jul. 2, 2019, 2 pages.

*Primary Examiner* — S. Joseph Morano
*Assistant Examiner* — Eva L Comino
(74) *Attorney, Agent, or Firm* — Dickinson Wright PLLC

(57)    ABSTRACT

A tire pressure control device of an off-road vehicle is configured for changing tire pressures of vehicle wheels of at least one vehicle axle. Each pneumatic tire has a pressure-controlled wheel valve which is pneumatically connected to a control pressure line and to a supply pressure line. The control pressure lines and the supply pressure lines are pneumatically connected to a compressed air supply device and controlled by an electronic control unit. The actuation of the wheel valves takes place axle by axle via control valves, and the compressed air supply of the vehicle wheels is carried out by side via supply valves.

20 Claims, 3 Drawing Sheets

(52) U.S. Cl.
CPC ...... *B60C 23/009* (2013.01); *B60C 2200/065* (2013.01); *B60C 2200/08* (2013.01); *B60C 2200/14* (2013.01)

(58) Field of Classification Search
CPC .......... B60C 2200/065; B60C 2200/08; B60C 2200/14
USPC ........................................................ 152/416
See application file for complete search history.

(56) References Cited

FOREIGN PATENT DOCUMENTS

| | | | | |
|---|---|---|---|---|
| AT | 9131 | * | 5/2007 | ........... B60C 23/003 |
| AT | 9131 U1 | | 5/2007 | |
| DE | 102008062066 A1 | | 6/2010 | |
| EP | 1362716 A2 | | 11/2003 | |
| EP | 2848436 A1 | | 3/2015 | |
| GB | 323412 | * | 1/1930 | |
| WO | WO-2011015368 A1 | * | 2/2011 | ........... B60C 23/003 |

* cited by examiner

TIRE PRESSURE CONTROL DEVICE FOR AN OFF-ROAD VEHICLE

TECHNICAL FIELD

The invention relates to a tire pressure control device of an off-road vehicle having pneumatic tires, which tire pressure control device is configured to change the tire pressures of the vehicle wheels of at least one vehicle axle of the vehicle during travel or during working use, wherein each vehicle wheel having a pneumatic tire has a pressure-controlled wheel valve, which is pneumatically connected to a control pressure line and to a supply pressure line, wherein the control pressure lines and the supply pressure lines are assigned valves, which are or can be pneumatically connected to a compressed air supply device of the vehicle and can be controlled by an electronic control unit in order to actuate the wheel valves of one or more of the vehicle wheels and to control their tire pressures as needed.

BACKGROUND

Off-road vehicles having pneumatic tires, for example, agricultural tractors, construction vehicles, military vehicles, special vehicles, or trucks, which are also or predominantly intended for off-road use, are increasingly provided with a tire pressure control device, by means of which the tire pressures of the vehicle wheels can be changed, i.e., can be increased or decreased as needed. Whereas travel on paved roads requires a small contact surface of the vehicle tires, effected by increased tire pressure, in order to achieve a low rolling resistance and a good adhesion of the vehicle tires on the roadway, the lowest possible tire pressure is advantageous for off-road use, for example during field work on a field or when harvesting wood in the forest, whereby sinking of the vehicle wheels in the soft soil and undesired compaction of the soil is prevented and the traction of the driven vehicle wheels is increased on account of the increased contact area of the vehicle tires. Off-road vehicles are usually equipped with a compressed air braking system, so that the tire pressure control device can advantageously use the existing compressed air supply device of the braking system to be able to adjust the tire pressures of the vehicle wheels during travel or during working use of the vehicle as needed. Such tire pressure control devices are known in various embodiments, wherein the known systems essentially differ in the arrangement and the number of valves and pneumatic supply lines and their interconnection.

In a known tire pressure control device 1', which is shown schematically and in simplified form in FIG. 3, of a two-axle off-road vehicle, for example, for a tractor, the four vehicle wheels 2a, 2b, 3a, 3b of the two vehicle axles 2, 3 have four pressure-controlled wheel valves 4a, 4b, 5a, 5b, which are pneumatically connected to four control pressure lines S1a', S1b', S2a', S2b' and also to two supply pressure lines V1', V2' via respective assigned rotary transmitters 13a, 13b, 14a, 14b. Compressed air can be applied to the four control pressure lines S1a', S1b', S2a', S2b' and the two supply pressure lines V1', V2' from a compressed air supply device 6 of the vehicle as the compressed air source for the tire pressure control device 1'.

The two supply pressure lines V1', V2' are pneumatically connected via two pneumatic lines P1', P2' to the compressed air supply device 6. The control pressure lines S1a', S1b', S2a', S2b' are pneumatically connected to a central control valve device 9 designed as a valve block. The control valve device 9 is in turn pneumatically connected to the compressed air supply device 6 and to an electronic control unit 10'. The electronic control unit 10' is electrically connected to a power supply 7 of the vehicle.

By means of the electronic control unit 10', the control valve device 9 can be controlled automatically or by means of a manual operating unit 10a' and, for example, electromagnetically actuated to pneumatically impinge the wheel valves 4a, 4b, 5a, 5b of the vehicle wheels 2a, 2b, 3a, 3b individually using the compressed air supply device 6 or to block them.

A separate control pressure line S1a', S1b', S2a', S2b' originates from the central control valve device 9 for each of the four wheel valves 4a, 4b, 5a, 5b. The wheel valves 4a, 4b, 5a, 5b can be switched by pneumatic impingement, so that the corresponding wheel tires of the vehicle wheels 2a, 2b, 3a, 3b can have a pressure connection established to the relevant supply pressure lines V1', V2' or can be blocked from them. In the two pneumatic lines P1', P2', which connect the supply pressure lines V1', V2' to the compressed air supply device 6, controllable supply valves 11', 12' are arranged, which are designed, for example, as solenoid valves. These supply valves 11', 12' are electrically connected via electrical lines E1', E2' to the electronic control unit 10' and can be controlled thereby to aerate the supply pressure lines V1', V2' via the compressed air supply device 6 or to deaerate them via outlets 11a', 12a' connected to the supply valves 11', 12' depending on the switch positions of the supply valves 11', 12'.

The vehicle wheels 2a, 2b, 3a, 3b, or the wheel valves 4a, 4b, 5a, 5b of each vehicle axle 2, 3 can each be supplied with compressed air via a common supply pressure line V1' or V2'. The pneumatic supply of the vehicle wheels 2a, 2b, 3a, 3b is thus carried out axle by axle, wherein one supply valve 11', 12' is assigned to each vehicle axle 2, 3.

The outlet 11a', 12a' of the supply valve 11', 12' is available in each case to deaerate the wheel tires of the vehicle wheels 2a, 2b, 3a, 3b on each vehicle axle 2, 3. Each wheel valve 4a, 4b, 5a, 5b can be switched pneumatically open via the control pressure line S1a', S1b', S2a', S2b' connected to this wheel valve 4a, 4b, 5a, 5b by control of the central control valve device 9 and the relevant wheel tires of the vehicle wheel 2a, 2b, 3a, 3b can thus be connected with respect to pressure to the supply pressure line V1', V2' connected to the wheel valve 4a, 4b, 5a, 5b. The wheel tires of the respective vehicle wheel 2a, 2b, 3a, 3b can be aerated or deaerated by controlling the supply valve 11', 12' of the relevant supply pressure line V1', V2' depending on the switch position of the supply valve 11', 12'. Therefore, the tire pressures at the vehicle wheels 2a, 2b, 3a, 3b can be increased or decreased individually by a manual input at the operating unit 10a of the electronic control unit 10 or by an automatic tire pressure control function. An illustration of pressure sensors and pressure limiting valves was omitted in FIG. 3. However, these components can be provided.

In tire pressure control devices according to FIG. 3, as already noted, a separate control pressure line is assigned to each vehicle wheel or each wheel valve. Each of these control pressure lines is connected to a central control valve device common to all vehicle axles, which has a number of switchable pneumatic fittings corresponding to the number of the provided control pressure lines, and are individually pneumatically controllable via this control valve device. This known control valve device is thus designed for a predetermined number of vehicle wheels or wheel valves and is limited in this way. In general, tire pressure control devices are conceived for two-axle vehicles, for example, for two-axle tractors. An expansion having additional fittings for control pressure lines for further vehicle axles or further vehicle wheels is not possible without significant expenditure, particularly because the installation space which is available for a housing of the control valve device is usually limited.

Moreover, in such tire pressure control devices, a common supply pressure line having a common supply valve is assigned to the vehicle wheels or the wheel valves of each vehicle axle, as already mentioned. Therefore, one supply valve is required per vehicle axle. If one presumes a two-axle vehicle as a standard for a tire pressure control device, an adaptation of the tire pressure control device to a vehicle having three, four, or more axles would thus result in significant additional costs for further supply valves. Moreover, the connection of the supply pressure circuits arranged axle by axle to the atmosphere is a bottleneck, which can have a disadvantageous effect in particular if the tire sizes are very different by axle. Since the compressed air supply takes place axle by axle via one common supply valve per vehicle axle, the reduction of one or both tire pressures of the vehicle wheels of this axle, depending on whether one or both wheel valves are switched open by the control valve device, can always only take place from a single associated outlet of the supply valve on this axle. Predominantly tractors can additionally have very different tire sizes by axle, in particular significantly smaller wheels on the front axle than on the rear axle. If all tire pressures are reduced simultaneously, this has the result that the reduction of the tire pressure on the rear wheels takes significantly longer than on the front wheels. In this case, the outlet on the front axle would not be optimally utilized, while the outlet on the rear axle is active for an excessively long time, so that the deaeration process is not optimal as a whole in the known arrangement of a tire pressure control device.

EP 1 362 716 B1 discloses another tire pressure control device in which a common control pressure line having a common control valve for the relevant axle and a common supply pressure line having a common supply valve for the relevant axle is assigned to each vehicle axle. The number of the control valve components is thus less in comparison, but with the disadvantage that the tire pressures can only be changed by axle, but not individually, since both wheel valves of the two vehicle wheels of an axle are always actuated simultaneously and the compressed air supply is also switched by axle for both vehicle wheels.

A further tire pressure control device is known from DE 10 2008 062 066 A1, in which the control pressure and supply pressure processes for changing the tire pressure take place via a single pneumatic supply line per vehicle axle functioning as a control pressure line and also as a supply pressure line. The actuation of the wheel valves is pulse controlled and is dependent on the level of the respective pressure pulses, whereby the control of the valve components is relatively complex. In this arrangement, a central control valve and an electromechanically operated pressure distributor and a pressure sensor are respectively provided for each vehicle axle, which are housed in a common housing per vehicle axle. Each vehicle axle requires such a separate electropneumatic pressure distributor. The tire pressure control takes place by axle, a tire pressure change of individual wheels within a vehicle axle is not provided.

SUMMARY

Against this background, the invention was based on the object of providing a tire pressure control device of an off-road vehicle having pneumatic tires of the type mentioned at the outset, which has more efficient operating and control properties in comparison to the known tire pressure control devices. In particular, this tire pressure control device is to be able to be adapted easily and inexpensively to a predetermined number of vehicle axles. The tire pressure control device is to permit a tire pressure adjustment at individual vehicle wheels. Moreover, the pressure control processes at the vehicle wheels are to be able to be carried out in the most time-optimal manner. Moreover, an off-road vehicle having pneumatic tires is to be provided, which has such a tire pressure control device.

This object is achieved by a tire pressure control device which has the features of claim 1, while advantageous designs and refinements of the invention can be inferred from the associated dependent claims. The off-road vehicle which has a tire pressure control device according to the invention is claimed by independent claim 9.

The invention was based on the finding that known tire pressure control devices, in which the vehicle wheels are interconnected axle by axle by control pressure lines and supply pressure lines arranged in parallel, require a high expenditure in costs and components for supply lines, valves, control devices, and installation space required for this purpose, in particular the more vehicle axles the vehicle has which are to be incorporated into the tire pressure control. Due to an architecture of supply lines, valves, and control devices, which is not designed beforehand for a specific number of vehicle axles, but rather can be adapted to any arbitrary number of axles, without therefor requiring a parallel arrangement repeating axle by axle of control pressure lines and supply pressure lines, the expenditure for pneumatic lines and for valves and control devices can be significantly reduced, in particular in a vehicle having three, four, or more axles. Moreover, the installed components can be used more efficiently by such an architecture, so that in addition improved operating convenience can be achieved.

The invention therefore relates to a tire pressure control device of an off-road vehicle having pneumatic tires, by means of which tire pressure control device the tire pressures of the vehicle wheels of at least one vehicle axle of the vehicle can be changed during travel or during working use, wherein each vehicle wheel having a pneumatic tire has a pressure-controlled wheel valve, which is pneumatically connected to a control pressure line and to a supply pressure line. Here, the control pressure lines and the supply pressure lines are assigned valves, which are or can be pneumatically connected to a compressed air supply device of the vehicle and can be controlled by an electronic control unit in order to actuate the wheel valves of one or more of the vehicle wheels and to control their tire pressures as needed.

To achieve the stated object, the invention provides in such a tire pressure control device that each of the vehicle axles of the vehicle incorporated into the tire pressure control device is respectively assigned a control pressure line respectively having a control valve, so that the actuation of the wheel valves of the vehicle wheels of the vehicle takes place axle by axle via the control valves, and each of the two left and right vehicle sides of the vehicle respectively is assigned a supply pressure line respectively having at least one supply valve, so that the compressed air supply of the vehicle wheels of the vehicle is carried out by side via the supply valves.

Accordingly, in the tire pressure control device according to the invention, a crossed arrangement of supply pressure lines having supply valves and control pressure lines having control valves is provided. This means that respectively one supply valve for one vehicle side and respectively one control valve per vehicle axle are arranged. Multiple supply valves per vehicle side can also advantageously be provided, as will be explained later, but this is not absolutely necessary for the function of the tire pressure control device.

This arrangement is adaptable with a low expenditure for components and installation costs to a predetermined number of axles of an off-road vehicle. In particular, in the case of an expansion for more than two vehicle axles, only one additional control pressure line having an additional control valve per additional vehicle axle is to be provided. It is particularly advantageous that in the case of an expansion of the number of axles, additional supply pressure lines and additional supply valves are not required. A savings of components and installation costs thus results in comparison to conventional tire pressure control devices for more than two vehicle axles.

Moreover, a central valve block, which is generally accompanied by a large installation space requirement, is not required. Instead, comparatively small and easy-to-install control valves are advantageously used. Installation problems as can arise upon the expansion of a valve block, which is already large in any case, with additional fittings for three or more vehicle axles, are thus avoided from the outset.

The tire pressure control device according to the invention is preferably provided for vehicles having two or more than two axles, but it can also be used on only one vehicle axle, for example, on a single-axle trailer. A tire pressure control device is thus provided which is adaptable starting from a two-axle vehicle in a relatively simple and inexpensive manner to both single-axle vehicles and also to multi-axle vehicles and is implementable therein.

In one advantageous embodiment of the tire pressure control device according to the invention, it is provided that the respective control valves have two switch positions, wherein in a first switch position of the control valve, the wheel valves of the vehicle wheels of the relevant vehicle axle connected to the associated control pressure line are pneumatically connected to the compressed air supply device of the vehicle and in a second switch position are blocked from it. Moreover, the respective supply valves have three switch positions, wherein in a first switch position of the supply valve, the wheel valves of the vehicle wheels of the relevant vehicle side connected to the associated supply pressure line are connected to the compressed air supply device, in a second switch position they are connected to an outlet, and in a third switch position they are blocked from the compressed air supply device and from the outlet.

The control valves, which are designed, for example, as solenoid directional valves, can accordingly have two switch positions. In its first switch position, a control valve connects the pressure-controlled wheel valves assigned to it, which are designed, for example, as spring-loaded check valves, of the relevant vehicle axle to the compressed air supply, so that they are pneumatically impinged and thus in turn release a connection to the respective associated supply pressure line. In its second switch position, the control valve blocks the relevant wheel valves from the compressed air supply.

The supply valves, which each consist, for example, of one or more interconnected solenoid directional valves, can advantageously have three switch positions. In its first switch position, the supply valve connects the wheel valves connected to the relevant left or right supply line to the compressed air supply. In its second switch position, the supply valve connects the wheel valves connected to the relevant left or right supply line to an outlet to the atmosphere. In its third switch position, the supply valve blocks the wheel valves connected to the relevant left or right supply line both from the compressed air supply and also from the outlet. The respective switch positions of the left and right supply valves each only act on the tire pressures of the vehicle wheels, the wheel valves of which are switched by the associated control valves. The control of the control valves and the supply valves takes place via an electronic control unit. It is preferably integrated into a CAN bus of a vehicle electrical system of the vehicle.

The crossed arrangement of the control pressure and supply pressure components enables, in cooperation with the possible switch positions of the control valves and the supply valves, an efficient tire pressure control which can be carried out alternatively and as needed as a single tire pressure control on individual vehicle wheels, as axle by axle tire pressure control on individual vehicle axles, or as tire pressure control of all connected vehicle wheels simultaneously.

In the case of a single wheel aeration, for example, of the right front tire, the right supply valve and the front control valve are actuated. The right front wheel valve is thus actuated and compressed air flows into the right front wheel tire to increase its tire pressure. In addition, the left front wheel valve is also actuated since the control valve impinges the wheel valves by axle. This does result in a marginal pressure loss in the left front wheel tire. However, since the line volume of the left supply pressure line is very small in comparison to the tire volume, this loss can be accepted without disadvantage. In the case of an axle by axle wheel aeration, for example, of the vehicle wheels of the front axle, the right supply valve and the left supply valve and also the front-axle control valve are actuated. In the case of a wheel aeration of the vehicle wheels of the front axle and the rear axle, the right supply valve and the left supply valve and also the front-axle and the rear-axle control valve are actuated.

In the case of more than two axles, in addition the control valves of the additional axles connected using additional control pressure lines to the additional wheel valves are to be actuated to aerate all vehicle wheels, while the two provided supply valves can in principle supply an arbitrary number of vehicle axles with compressed air. For this purpose, the two supply pressure lines merely have to be extended to the further wheel valves or provided with corresponding branches. Additional supply valves are not required, however.

According to one embodiment of the invention, it can be provided that each supply valve is respectively assigned one atmosphere outlet, so that a simultaneous pressure reduction at multiple vehicle wheels of multiple vehicle axles can be controlled by vehicle side.

When letting out compressed air from multiple wheel tires simultaneously to reduce the tire pressures at the relevant vehicle wheels, more efficient utilization of the outlets of the supply valves is achieved by the tire pressure control device according to the invention. Because every supply valve is respectively assigned an atmosphere outlet and the supply valves are arranged by side, in the case of the deaeration of two wheel tires on one vehicle axle, both outlets on the right and left vehicle side can advantageously be switched open. In contrast thereto, conventional tire pressure control devices having a compressed air supply by axle and deaeration by axle would only be able to use one outlet in this case. The duration for the tire pressure reduction on a vehicle axle may thus be halved in comparison using the crossed arrangement according to the invention.

Moreover, the influence of various tire sizes on the vehicle axles can advantageously be eliminated by the pneumatic connection between front wheel and rear wheel for each side. In the case of a deaeration of all wheel tires from an equal pressure level at all wheels to a new level, which is a frequently required process, both outlets are operated, i.e., right side and left side, until the required tire pressure is set at all wheels. The duration of the process can be kept to a minimum since both outlets are used for equal lengths of time. In contrast thereto, conventional tire pressure control devices having a compressed air supply by axle and deaeration by axle would use the two outlets for different lengths of time in this case, whereby the control process would be extended in time.

In vehicles having a high number of axles, for example, having six or eight vehicle axles, it can be advantageous to arrange two cooperating supply valves on each vehicle side. The compressed air throughput during a tire pressure increase or during a tire pressure decrease can thus be increased, so that a short duration for this control process is achieved even in the case of a multi-axle vehicle.

According to another refinement of the invention, it is provided that each supply pressure line is respectively assigned a tire pressure sensor and a tire pressure limiting valve.

To carry out a control of the tire pressures, firstly the present tire pressures have to be detected or known. Each of the two left-side and right-side supply pressure lines can have a pressure sensor, which can be designed, for example, as piezoelectric sensors having pulse-width-modulated output signals. The tire pressure measurement then takes place by axle, by the control valves being actuated step-by-step in each case for one axle, for example, firstly for the front wheels then for the rear wheels. The wheel valves are gradually opened by axle, so that in each case for one axle the tire pressure of the left wheel tire fills the left supply line and the tire pressure of the right wheel tire fills the right supply pressure line and also a pressure equilibrium results in each case between the tire interior and the associated supply line. The tire pressure is measured on the left side and right side using the left or the right pressure sensor, respectively. The pressure measurement only takes a few seconds per axle. During the pressure measurement, the supply valves are closed so that aerating or deaerating processes cannot influence the pressure measurement. After each pressure measurement, the supply pressure lines are expediently deaerated by a short switching pulse of the supply valves before the next measuring process begins.

Moreover, each supply line can have a mechanical pressure limiting valve, which can be designed, for example, as simple mechanical overpressure valves. It is thus ensured that a maximum permissible tire pressure is not exceeded, even in case of a failure of the electronic control unit. An overpressure is dissipated via the respective pressure limiting valve. It is particularly advantageous that independently of the number of the axles of the vehicle, only one pressure sensor is required per vehicle side and one pressure limiting valve is required per vehicle side. Accordingly, only two pressure sensors and two pressure limiting valves are required even for vehicles having more than two axles.

According to another advantageous embodiment, it is provided that the tire pressure control device is designed to carry out the following functions:
a) target pressure setting having terrain preselection option,
b) pressure monitoring having preselectable automation and/or on driver request,
c) flat tire recognition having warning display, and
d) mechanical overpressure protection.

The function of the "target pressure setting" can function as a convenient driver assistance system. The driver can accordingly select a program suitable for the present operating situation of the vehicle on an operating unit from a list of programs and request it. A suitable tire pressure for this purpose is stored in the program, which can also be dependent on predetermined parameters of the vehicle. The tire pressure can be read out, for example, from a characteristic map or from a characteristic curve. The electronic control unit sets the provided pressure or pressures at the vehicle wheels, wherein the settings take place sequentially in the case of different pressures.

The function of the "pressure monitoring" can advantageously make use of different modes. For example, pressure detections at programmable predetermined monitoring cycles having fixed intervals are possible. If certain events or situations are recognized, an unscheduled pressure detection can be triggered. Moreover, the driver can manually request a pressure detection at any time.

The function of the "flat tire recognition" increases the level of safety of the vehicle in driving operation. A warning signal can accordingly be output if a pressure drop is detected at one or more vehicle wheels. For example, a tolerance window can be predetermined beforehand, within which pressure deviations from the presently set target value are permitted. If the pressure falls below a predetermined threshold value, a warning "low tire pressure" is generated and displayed to the driver. This can be followed by an automatic test routine, within which all or individual wheel tires are aerated to check them. If the tire pressure at the affected wheel tire or tires does not increase or does not increase sufficiently within a predetermined time period, a second warning "flat tire" is displayed.

The function "mechanical overpressure protection" ensures as already mentioned by means of a pressure limiting valve that a safety-critical maximum tire pressure cannot be exceeded.

In addition, it can be provided that an error recognition is implemented in the tire pressure control device, by which a warning signal can be generated and displayed upon recognition of a failure or a malfunction of the electronic control unit.

A high level of operational safety of the novel tire pressure control device provided here is ensured by the mentioned functions flat tire recognition, overpressure protection, and the electronic error recognition. The driver can therefore be informed at any time about the functional readiness of the system.

The tire pressure control device according to the invention can advantageously be adapted relatively easily to various multi-axle vehicles. For various numbers of axles, it can be provided that the electronic control unit is designed as a 2-channel, 4-channel, 6-channel, 8-channel, 10-channel, 12-channel, 14-channel, or 16-channel controller for one, two, three, four, five, six, seven, or eight vehicle axles. The number of the channels relates here to the number of the vehicle wheels, the tire pressure of which is to be controlled. Accordingly, two interfaces for controlling two control valves each are provided for each vehicle axle. Moreover, at least two supply valves can be controlled by means of the control unit independently of the number of the vehicle axles. At least two further interfaces are accordingly provided for this purpose.

In addition, it is also possible to advantageously combine two or more tire pressure control devices with one another.

According to a further embodiment of the invention, it can therefore be provided that for a tire pressure control on a six-axle or on an eight-axle vehicle, respectively two control units designed as 6-channel controllers or two control units designed as 8-channel controllers, respectively, are arranged, wherein the two relevant control units are functionally interconnected via a CAN bus and are operable by means of a common operating unit.

It is to be noted at this point that when reference is made to a vehicle tire, this can be not only a single tire here, but rather also a vehicle wheel having a double tire (twin tires), which can be controlled and monitored by the control pressure valves and supply valves of the tire pressure control device.

Finally, the invention also relates to an off-road vehicle, such as an agricultural tractor, a construction vehicle, a military vehicle, a special vehicle, or a truck, as a single vehicle or as a tractor-trailer combination, having a tire pressure control device which has the features of at least one of the device claims.

The invention is explained in greater detail hereinafter on the basis of two exemplary embodiments illustrated in the appended drawings.

DETAILED DESCRIPTION OF THE DRAWINGS

Several components in the figures correspond to each other and are identified by the same reference signs. For better differentiation, all pneumatic supply pressure lines are prefixed by a prefix "V", all pneumatic control pressure lines are prefixed by a prefix "S", all other pneumatic lines are prefixed by a prefix "P", and all electrical lines are prefixed by a prefix "E".

Figure 3:
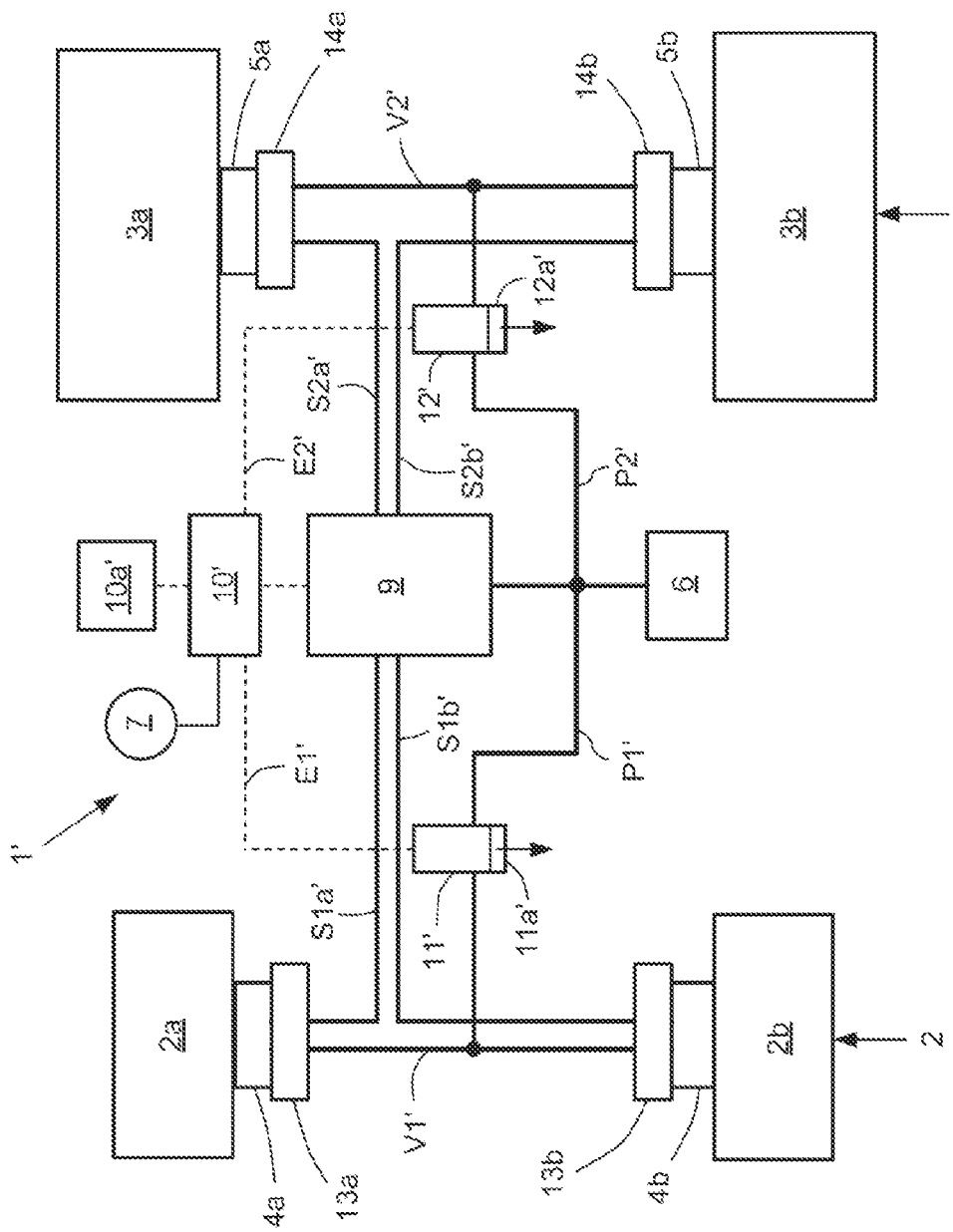
FIG. 3 shows a tire pressure control device according to the prior art in a schematic overview illustration.

A tire pressure control device 1' according to the prior art illustrated in FIG. 3 has already been described at the outset. In contrast to this known tire pressure control device 1', a tire pressure control device 1 of an off-road vehicle 100 according to the invention illustrated in FIG. 1 firstly has a first supply pressure line V1, which pneumatically connects the wheel valve 4a of the right front vehicle wheel 2a to the wheel valve 5a of the right rear vehicle wheel 3a. Moreover, it has a second supply pressure line V2, which pneumatically connects the wheel valve 4b of the left front vehicle wheel 2b to the wheel valve 5b of the left rear vehicle wheel 3b. The compressed air supply accordingly takes place according to the invention by side instead of by axle as in the conventional devices.

Moreover, a first control pressure line S1, which pneumatically interconnects the two wheel valves 4a, 4b of the two front vehicle wheels 2a, 2b, and a second control pressure line S2, which pneumatically interconnects the two wheel valves 5a, 5b of the two rear vehicle wheels 3a, 3b, are arranged. These two control pressure lines S1, S2 are pneumatically connected via a first line P1 or via a second pneumatic line P2, respectively, to the compressed air supply device 6 of the vehicle. The actuation of the wheel valves 4a, 4b, 5a, 5b of the vehicle by the control pressure accordingly takes place according to the invention by axle instead of individually for each vehicle wheel 2a, 2b, 3a, 3b, as will be described.

A first supply valve 11 is arranged in the first supply pressure line V1, which has two fittings for alternatively aerating the first supply pressure line V1 from the compressed air supply device 6 or for deaerating the first supply pressure line V1 via a first outlet 11a to the atmosphere. A second supply valve 12 is arranged in the second supply pressure line V2, which also has two fittings for alternatively aerating the second supply pressure line V2 from the compressed air supply device 6 or for deaerating the second supply pressure line V2 via a second outlet 12a to the atmosphere. The two supply valves 11, 12 are designed as solenoid directional valves, which are electrically connected to an electronic control unit 10 via a first or second electrical line E1, E2, respectively, and are electrically actuated by this control unit.

The supply valves 11, 12 preferably each have three switch positions, namely a first switch position for aerating, a second switch position for deaerating, and a third switch position for blocking the associated supply pressure line V1, V2 with respect to the outlet 11a, 12a and with respect to the compressed air supply device 6. In the third switch position, the pneumatic connections of the wheel valves 4a, 4b, 5a, 5b of the respective vehicle side remain open to one another, the supply pressure line V1, V2 is thus not pneumatically interrupted.

In the first pneumatic line P1 for connecting the first control pressure line S1 to the compressed air supply device 6, a first control valve 15 is arranged, which is connected on the inlet side to the compressed air supply device 6 and on the outlet side to the first control pressure line S1. The first control valve 15 is electrically connected via a third electrical line E3 to the electronic control unit 10 and can be controlled by this control unit. In the second pneumatic line P2 for connecting the second control pressure line S2 to the compressed air supply device 6, a second control valve 16 is arranged, which is connected on the inlet side to the compressed air supply device 6 and on the outlet side to the second control pressure line S2. The second control valve 16 is electrically connected via a fourth electrical line E4 to the electronic control unit 10 and can be controlled by this control unit. The two control valves 15, 16 preferably each have two switch positions, namely a first switch position for aerating and a second switch position for blocking the two control pressure lines S1, S2. A central control valve unit is not provided and is also not required.

Moreover, a first pressure limiting valve 17a and a first pressure sensor 18a are connected to the first supply pressure line V1. The first pressure sensor 18a is connected via a fifth electrical line E5 to the electronic control unit 10. Correspondingly, a second pressure limiting valve 17b and a second pressure sensor 18b are connected to the second supply pressure line V2. The second pressure sensor 18b is connected via a sixth electrical line E6 to the electronic control unit 10.

It is ensured by means of the pressure limiting valves 17a, 17b that a maximum permissible tire filling pressure cannot be exceeded. This applies both for cases of mechanical defects on the control valves 15, 16 and/or on the supply valves 11, 12 and also in the case of an incorrectly operating or failed electronic control unit 10. The pressure sensors 18a, 18b are used to detect the tire pressures and provide them as measured values to the control unit 10 for tire pressure control.

An operating unit 10a to be manually actuated is connected to the electronic control unit 10 via a seventh electrical line E7. The electronic control unit 10 is moreover connected via an electrical line E8 to the power supply 7. Detected tire pressures of the vehicle wheels 2a, 2b, 3a, 3b can be displayed and desired tire pressures can be set at the operating unit 10a, and also automatic programs for pressure detection and pressure control can be selected.

The first control valve 15 actuates in its first switch position the first wheel valve 4a and the second wheel valve 4b of the two vehicle wheels 2a, 2b of the first vehicle axle 2, the front axle here. The second control valve 16 actuates in its first switch position the third and the fourth wheel valve 5a, 5b of the two vehicle wheels 3a, 3b of the second vehicle axle 3, the rear axle here. The first supply valve 11 provides in its first switch position the supply pressure to all vehicle wheels 2a, 3a of the right vehicle side, the right front wheel and the right rear wheel here. In the second switch position of the first supply valve 11, the first outlet 11a is opened for deaeration. In the third switch position of the first supply valve 11, the current tire pressure of the right front wheel 2a or the right rear wheel 3a is supplied via the first supply pressure line V1 to the first pressure sensor 18a, depending on which of the two associated wheel valves 4a, 5a is presently switched.

Correspondingly, the second supply valve 12 provides in its first switch position the supply pressure to all vehicle wheels 2b, 3b of the left vehicle side, the left front wheel 2b and the left rear wheel 3b here. In the second switch position of the second supply valve 12, the second outlet 12a is provided opened for deaeration. In the third switch position of the second supply valve 12, the current tire pressure of the left front wheel 2b or the left rear wheel 3b is supplied to the second pressure sensor 18b, depending on which of the two associated wheel valves 4b, 5b is presently switched.

Figure 1:
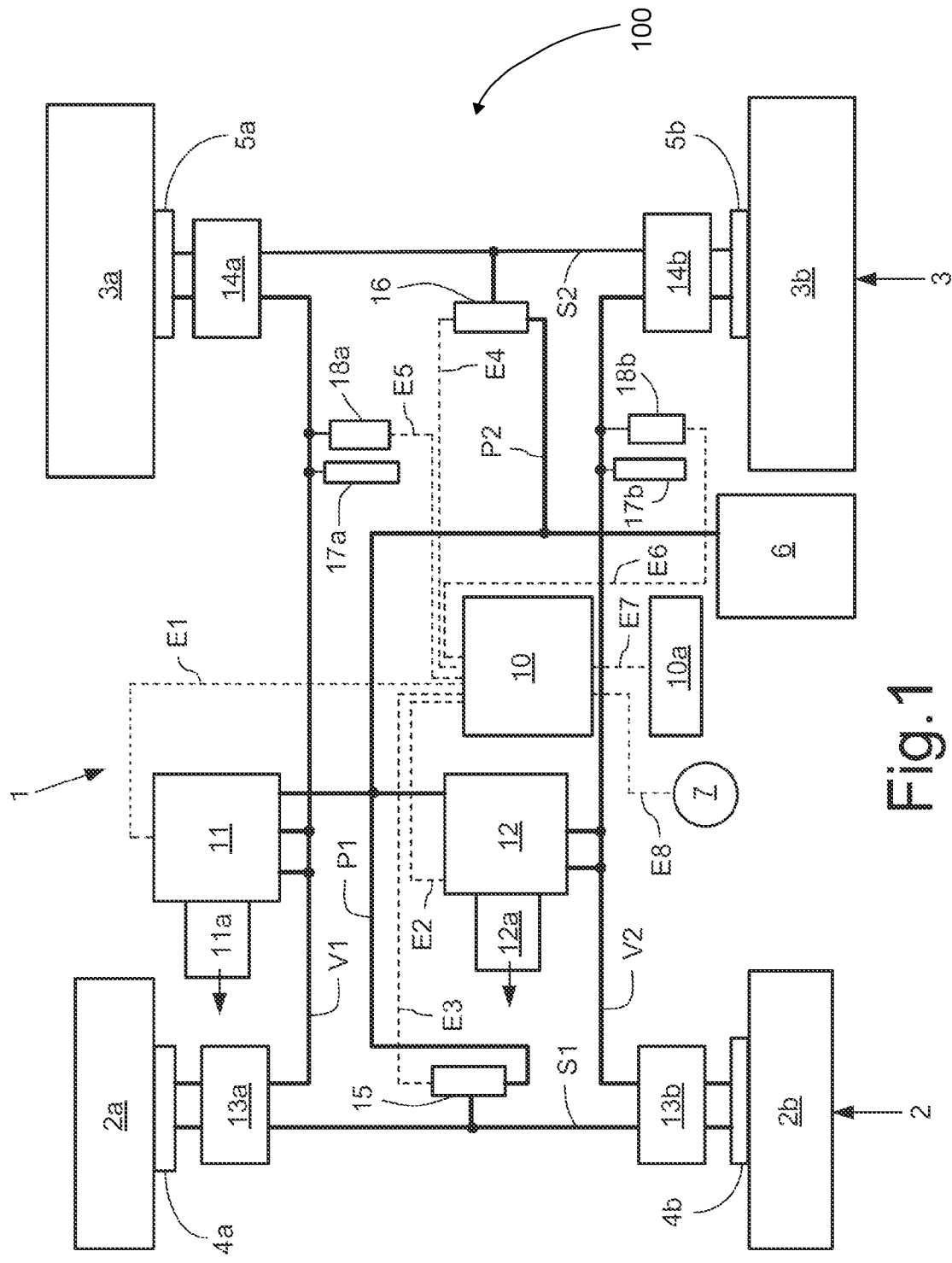
FIG. 1 shows a first embodiment of a tire pressure control device according to the invention in a schematic illustration.

The crossed arrangement of the two control pressure lines S1, S2 and the two supply pressure lines V1, V2 of the tire pressure control device 1 according to FIG. 1 enables, in cooperation with the possible switch positions of the control valves 15, 16 and the supply valves 11, 12, a tire pressure increase or a tire pressure decrease selectively at individual vehicle wheels 2a, 2b, 3a, 3b, at individual vehicle axles 2, 3, or at all vehicle wheels 2a, 2b, 3a, 3b simultaneously. The tire pressure measurement expediently takes place in each case using both supply valves 11, 12 at the vehicle axles 2, 3 axle by axle in succession.

Thus, for example, to raise the tire pressure of the right front wheel 2a, the first control valve 15 associated with the first vehicle axle 2 is switched into its passage position by the electronic control unit 10. The two wheel valves 4a, 4b of the two front vehicle wheels 2a, 2b are thus pneumatically impinged via the first control pressure line S1 with compressed air from the compressed air supply device 6 and opened. Simultaneously, only the first supply valve 11 assigned to the right vehicle side is controlled by the control unit 10, so that compressed air flows out of the compressed air supply device 6 via the first supply pressure line V1 into the wheel tires of the relevant vehicle wheel 2a. The left vehicle wheel 2b experiences a negligibly small pressure loss during this.

If the pressure at the left vehicle wheel 2b is also to be raised simultaneously, i.e., on the front vehicle axle 2 as a whole, the second supply valve 12 associated with the left vehicle side is thus also controlled and switched into its passage position.

If the tire pressure is to be raised at both vehicle axles 2, 3, the second control valve 16 assigned to the second vehicle axle 3 is thus additionally actuated. A reduction of the tire pressure takes place in the same manner, wherein the supply valves 11, 12 can be switched over to the opening of the associated outlets 11a, 12a.

A pressure increase or pressure decrease at individual or all vehicle axles 2, 3 or at individual vehicle wheels 2a, 2b, 3a, 3b can be manually input by the driver at the operating unit 10a. The driver can also select and start a program which automatically carries out a setting stored in a characteristic map for a certain type of terrain. Moreover, at any time a manual tire pressure measurement can be requested or an automatic pressure measurement and pressure monitoring can take place in predetermined cycles. The pressure monitoring can also include a flat tire recognition function, which detects and signals unexpected pressure deviations from a predetermined target pressure value outside a defined tolerance window. With the aid of a test routine, within which all or individual wheel tires are temporarily aerated for the sake of testing and subsequently the tire pressure time curve is detected, a low tire pressure or a flat tire can be recognized and displayed to the driver on the operating unit 10a.

Figure 2:
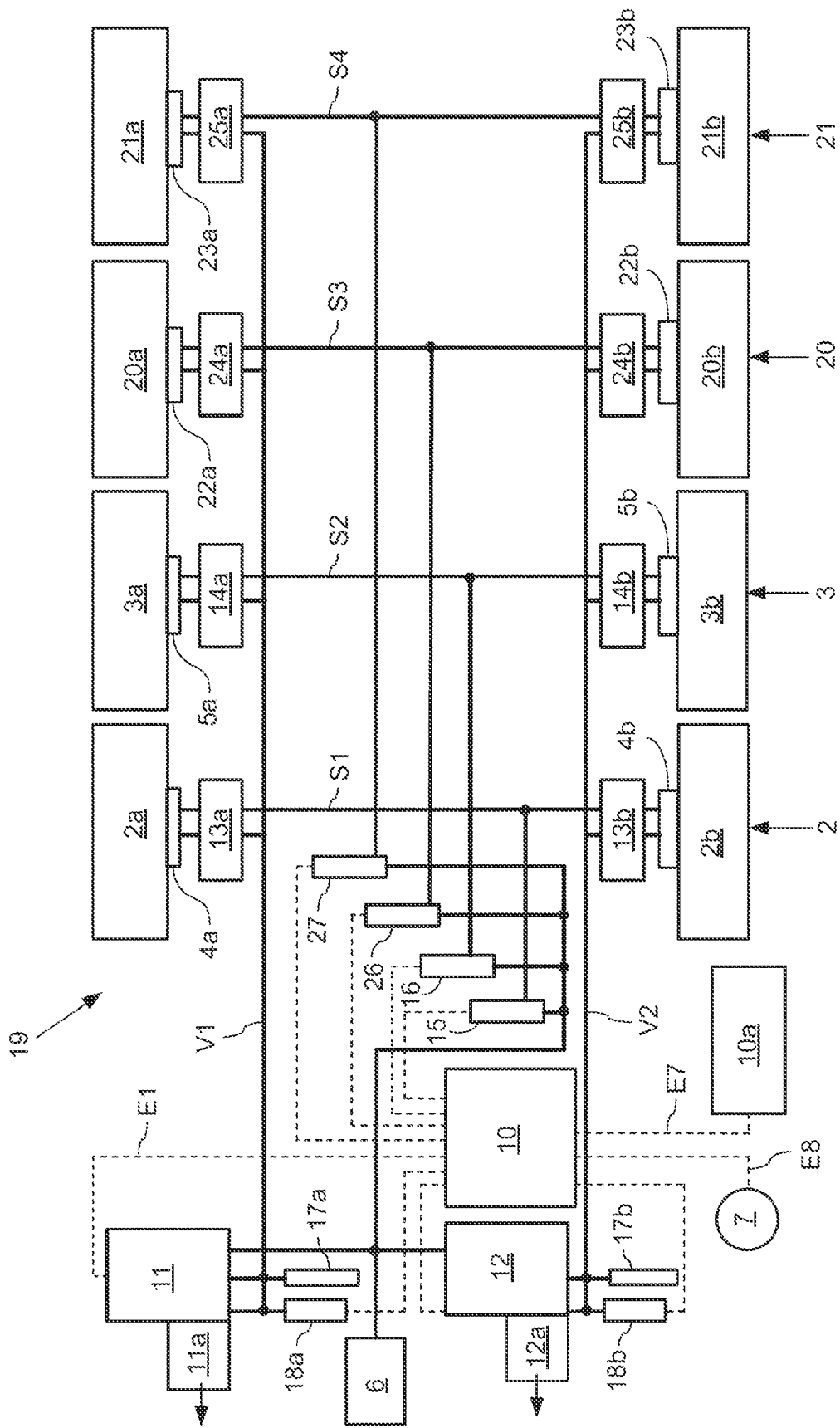
FIG. 2 shows a second embodiment of a tire pressure control device according to the invention in a schematic illustration.

FIG. 2 shows a second embodiment of a tire pressure control device 19 according to the invention for a vehicle having four vehicle axles 2, 3, 20, 21 and eight vehicle wheels 2a, 2b, 3a, 3b, 20a, 20b, 21a, 21b. The construction of this tire pressure control device 19 essentially corresponds to the structure of the tire pressure control device 1 according to FIG. 1, but with an expansion for the additional third and fourth vehicle axles 20, 21. The electrical connecting lines and multiple pneumatic branches are not all provided with reference signs here, but can be differentiated well by dashed or solid lines, respectively, and can also be assigned easily after the consideration of the exemplary embodiment according to FIG. 1.

Accordingly, the third vehicle axle 20 has a fifth vehicle wheel 20a having a fifth wheel valve 22a and a fifth rotary transmitter 24a, and a sixth vehicle wheel 20b having a sixth wheel valve 22b and a sixth rotary transmitter 24b. The fifth and sixth wheel valves 22a, 22b are pneumatically interconnected by a third control pressure line S3. A third control valve 26, which is activatable by the electronic control unit 10, is pneumatically connected to the third control pressure line S3. By switching the third control valve 26, the two wheel valves 22a, 22b are pneumatically opened or closed, respectively.

Moreover, the fourth vehicle axle 21 has a seventh vehicle wheel 21a having a seventh wheel valve 23a and a seventh rotary transmitter 25a and an eighth vehicle wheel 21b having an eighth wheel valve 23b and an eighth rotary transmitter 25b. The seventh and eighth wheel valves 23a, 23b are pneumatically interconnected by a fourth control pressure line S4. A fourth control valve 27, which is activatable by the electronic control unit 10, is pneumatically connected to this fourth control pressure line S4. The two wheel valves 23a, 23b are pneumatically opened or closed, respectively, by switching the control valve 27.

By switching the two supply valves 11, 12, depending on the switch position of the supply valves 11, 12 and the control valves 15, 16, 26, 27, compressed air flows into the wheel tires of the relevant vehicle wheels 2a, 2b, 3a, 3b, 20a, 20b, 21a, 21b to increase the pressure or flows out of the wheel tires to the outlets 11a, 12a to reduce the pressure.

The tire pressure control device 19 according to FIG. 2 can be expanded in a simple manner for a vehicle having a greater number of vehicle axles or can be reduced for a vehicle having a smaller number of vehicle axles. For an expansion, only one additional control pressure line having an additional control valve is required per additional axle. The electronic control unit 10 has to have accordingly many still free channels or interfaces, respectively. Additional supply valves, pressure sensors, and pressure limiting valves are not required, but are possible. For a reduction, one control pressure line and one control valve are dispensed with per omitted axle.

It is also possible to combine two or more than two tire pressure control devices according to FIG. 1 or according to FIG. 2 with one another. This can be implemented, for example, via a CAN bus connection and a common operating unit 10a for multiple tire pressure control devices 1, 19. In this case, two or more than two tire pressure control devices 1, 19 can communicate with one another in a so-called master/slave network and can together form, for example, a six-axle or eight-axle tire pressure control device.

The invention claimed is:

1. A tire pressure control device (1, 19) of an off-road vehicle having vehicle wheels with pneumatic tires, each of the vehicle wheels being associated with one vehicle axle of a plurality of vehicle axles, for changing tire pressures of the vehicle wheels (2a, 2b, 3a, 3b, 20a, 20b, 21a, 21b) of at least one vehicle axle (2, 3, 20, 21) of the vehicle during travel or during working use, the tire pressure control device comprising:

a respective pressure-controlled wheel valve (4a, 4b, 5a, 5b, 22a, 22b, 23a, 23b) associated with a pneumatic tire for each of the vehicle wheels, the pressure-controlled wheel valves being pneumatically connected to a control pressure line (S1, S2, S3, S4) and to a supply pressure line (V1, V2), wherein the control pressure lines (S1, S2, S3, S4) and the supply pressure lines (V1, V2) are assigned valves (11, 12, 15, 16, 26, 27), configured to be pneumatically connected to a compressed air supply device (6) of the vehicle and to be controlled by an electronic control unit (10) to actuate the pressure-controlled wheel valves (4a, 4b, 5a, 5b, 22a, 22b, 23a, 23b) of one or more of the vehicle wheels (2a, 2b, 3a, 3b, 20a, 20b, 21a, 21b) and to control the tire pressures as needed, wherein each of the vehicle axles (2, 3, 20, 21) of the vehicle incorporated into the tire pressure control device (1, 19) is respectively assigned a control pressure line (S1, S2, S3, S4) respectively having a control valve (15, 16, 26, 27) for actuating the pressure-controlled wheel valves (4a, 4b, 5a, 5b, 22a, 22b, 23a, 23b) of the vehicle wheels (2a, 2b, 3a, 3b, 20a, 20b, 21a, 21b) of the vehicle takes place by axle via the control valves (15, 16, 26, 27), wherein the vehicle wheels are associated with either a left vehicle side or a right vehicle side and each of the left and right vehicle sides of the vehicle respectively is assigned a supply pressure line (V1, V2) respectively having at least one supply valve (11, 12) for connecting the compressed air supply device to the vehicle wheels (2a, 2b, 3a, 3b, 20a, 20b, 21a, 21b) of the vehicle by side via the supply valves (11, 12).

2. The tire pressure control device as claimed in claim 1, wherein each of the respective control valves (15, 16, 26, 27) has two switch positions, wherein in a first switch position of the control valve (15, 16, 26, 27), wherein the pressure-controlled wheel valves (4a, 4b, 5a, 5b, 22a, 22b, 23a, 23b) of the vehicle wheels (2a, 2b, 3a, 3b, 20a, 20b, 21a, 21b) of the associated vehicle axle connected to the associated control pressure line (S1, S2, S3, S4) are pneumatically connected to the compressed air supply device (6) of the vehicle and in a second switch position are blocked from it, and wherein each of the supply valves (11, 12) has three switch positions, wherein, in a first switch position of the supply valve (11, 12), the pressure-controlled wheel valves (4a, 4b, 5a, 5b, 22a, 22b, 23a, 23b) of the vehicle wheels (2a, 2b, 3a, 3b, 20a, 20b, 21a, 21b) of the associated left or right vehicle side connected to the associated supply pressure line (V1, V2) are connected to the compressed air supply device (6), in a second switch position of the supply valve, the pressure-controlled wheel valves are connected to an outlet (11a, 12a), and in a third switch position of the supply valve, the pressure-controlled wheel valves are blocked from the compressed air supply device (6) and from the outlet (11a, 12a).

3. The tire pressure control device as claimed in claim 1, wherein each supply valve (11, 12) is respectively assigned one outlet (11a, 12a), permitting a simultaneous pressure reduction at multiple vehicle wheels (2a, 2b, 3a, 3b, 20a, 20b, 21a, 21b) of multiple ones of the vehicle axles (2, 3, 20, 21) by vehicle side.

4. The tire pressure control device as claimed in claim 1, wherein each supply pressure line (V1, V2) is respectively assigned a tire pressure sensor (18a, 18b).

5. The tire pressure control device as claimed in claim 1, wherein each supply pressure line (V1, V2) is respectively assigned a tire pressure limiting valve (17a, 17b).

6. The tire pressure control device as claimed in claim 1, further comprising an electronic control unit programmed to cause the tire pressure control device (1, 19) to carry out the following functions:

target pressure setting having terrain preselection option, pressure monitoring having preselectable automation and/or on driver request, flat tire recognition having a warning display, and mechanical overpressure protection.

7. The tire pressure control device as claimed in claim 1, further comprising an electronic control unit, wherein an error recognition function is implemented in the tire pressure control device (1, 19), by which a warning signal is generated and displayed upon recognition of a failure or a malfunction of the electronic control unit (10).

8. The tire pressure control device as claimed in claim 1, further comprising an electronic control unit (10) configured as a 2-channel, 4-channel, 6-channel, 8-channel, 10-channel, 12-channel, 14-channel, or 16-channel controller for one, two, three, four, five, six, seven, or eight of the vehicle axles (2, 3, 20, 21).

9. The tire pressure control device as claimed in claim 8, wherein for a tire pressure control on a six-axle or on an eight-axle vehicle, respectively two of the electronic control units configured as 6-channel controllers or two control units (10) configured as 8-channel controllers, respectively, are arranged, the two electronic control units (10) being functionally interconnected via a CAN bus and operable by a common operating unit (10a).

10. An off-road vehicle comprising the tire pressure control device (1, 19) according to claim 1.

11. A tire pressure control device (1, 19) of an off-road vehicle having vehicle wheels with pneumatic tires, each of the vehicle wheels being associated with one vehicle axle of a plurality of vehicle axles, for changing tire pressures of the vehicle wheels (2a, 2b, 3a, 3b, 20a, 20b, 21a, 21b) of at least one vehicle axle (2, 3, 20, 21) of the vehicle during travel or during working use, the tire pressure control device comprising:

a respective pressure-controlled wheel valve (4a, 4b, 5a, 5b, 22a, 22b, 23a, 23b) associated with a pneumatic tire for each of the vehicle wheels, the pressure-controlled wheel valves being pneumatically connected to a control pressure line (S1, S2, S3, S4) and to a supply pressure line (V1, V2), wherein the control pressure lines (S1, S2, S3, S4) and the supply pressure lines (V1, V2) are assigned valves (11, 12, 15, 16, 26, 27), configured to be pneumatically connected to a compressed air supply device (6) of the vehicle and to be controlled by an electronic control unit (10) to actuate the pressure-controlled wheel valves (4a, 4b, 5a, 5b, 22a, 22b, 23a, 23b) of one or more of the vehicle wheels (2a, 2b, 3a, 3b, 20a, 20b, 21a, 21b) and to control the tire pressures as needed, wherein each of the vehicle axles (2, 3, 20, 21) of the vehicle incorporated into the tire pressure control device (1, 19) is respectively assigned a control pressure line (S1, S2, S3, S4) respectively having a control valve (15, 16, 26, 27) for actuating the pressure-controlled wheel valves (4a, 4b, 5a, 5b, 22a, 22b, 23a, 23b) of the vehicle wheels (2a, 2b, 3a, 3b, 20a, 20b, 21a, 21b) of the vehicle takes place by axle via the control valves (15, 16, 26, 27), wherein the vehicle wheels are associated with either a left vehicle side or a right vehicle side and each of the left and right vehicle sides of the vehicle respectively is assigned a supply pressure line (V1, V2) respectively having at least one supply valve (11, 12) for connecting the compressed air supply device to the vehicle wheels (2a, 2b, 3a, 3b, 20a, 20b, 21a, 21b) of the vehicle by side via the supply valves (11, 12), wherein the tire pressure is controlled and adapted according to the travel or working operation of the vehicle.

12. The tire pressure control device of claim 11, wherein a single supply valve is provided on each of the left and right vehicle sides of the vehicle, wherein the single supply valve supplies multiple vehicle wheels on each respective side.

13. The tire pressure control device as claimed in claim 11, wherein each of the respective control valves (15, 16, 26, 27) has two switch positions, wherein in a first switch position of the control valve (15, 16, 26, 27), wherein the pressure-controlled wheel valves (4a, 4b, 5a, 5b, 22a, 22b, 23a, 23b) of the vehicle wheels (2a, 2b, 3a, 3b, 20a, 20b, 21a, 21b) of the associated vehicle axle connected to the associated control pressure line (S1, S2, S3, S4) are pneumatically connected to the compressed air supply device (6) of the vehicle and in a second switch position are blocked from it, and wherein each of the supply valves (11, 12) has three switch positions, wherein, in a first switch position of the supply valve (11, 12), the pressure-controlled wheel valves (4a, 4b, 5a, 5b, 22a, 22b, 23a, 23b) of the vehicle wheels (2a, 2b, 3a, 3b, 20a, 20b, 21a, 21b) of the associated left or right vehicle side connected to the associated supply pressure line (V1, V2) are connected to the compressed air supply device (6), in a second switch position of the supply valve, the pressure-controlled wheel valves are connected to an outlet (11a, 12a), and in a third switch position of the supply valve, the pressure-controlled wheel valves are blocked from the compressed air supply device (6) and from the outlet (11a, 12a).

14. The tire pressure control device as claimed in claim 11, wherein each supply valve (11, 12) is respectively assigned one outlet (11a, 12a), permitting a simultaneous pressure reduction at multiple vehicle wheels (2a, 2b, 3a, 3b, 20a, 20b, 21a, 21b) of multiple ones of the vehicle axles (2, 3, 20, 21) by vehicle side.

15. The tire pressure control device as claimed in claim 11, wherein each supply pressure line (V1, V2) is respectively assigned a tire pressure sensor (18a, 18b).

16. The tire pressure control device as claimed in claim 11, wherein each supply pressure line (V1, V2) is respectively assigned a tire pressure limiting valve (17a, 17b).

17. The tire pressure control device as claimed in claim 11, further comprising an electronic control unit programmed to cause the tire pressure control device (1, 19) to carry out the following functions:
target pressure setting having terrain preselection option,
pressure monitoring having preselectable automation and/or on driver request,
flat tire recognition having a warning display, and
mechanical overpressure protection.

18. The tire pressure control device as claimed in claim 11, further comprising an electronic control unit, wherein an error recognition function is implemented in the tire pressure control device (1, 19), by which a warning signal is generated and displayed upon recognition of a failure or a malfunction of the electronic control unit (10).

19. The tire pressure control device as claimed in claim 11, further comprising an electronic control unit (10) configured as a 2-channel, 4-channel, 6-channel, 8-channel, 10-channel, 12-channel, 14-channel, or 16-channel controller for one, two, three, four, five, six, seven, or eight of the vehicle axles (2, 3, 20, 21).

20. The tire pressure control device as claimed in claim 19, wherein for a tire pressure control on a six-axle or on an eight-axle vehicle, respectively two of the electronic control units configured as 6-channel controllers or two control units (10) configured as 8-channel controllers, respectively, are arranged, the two electronic control units (10) being functionally interconnected via a CAN bus and operable by a common operating unit (10a).

* * * * *